Sept. 5, 1944.     M. P. MATUSZAK     2,357,753
WINDOW RESISTANT TO HYDROFLUORIC ACID
Filed Feb. 6, 1942
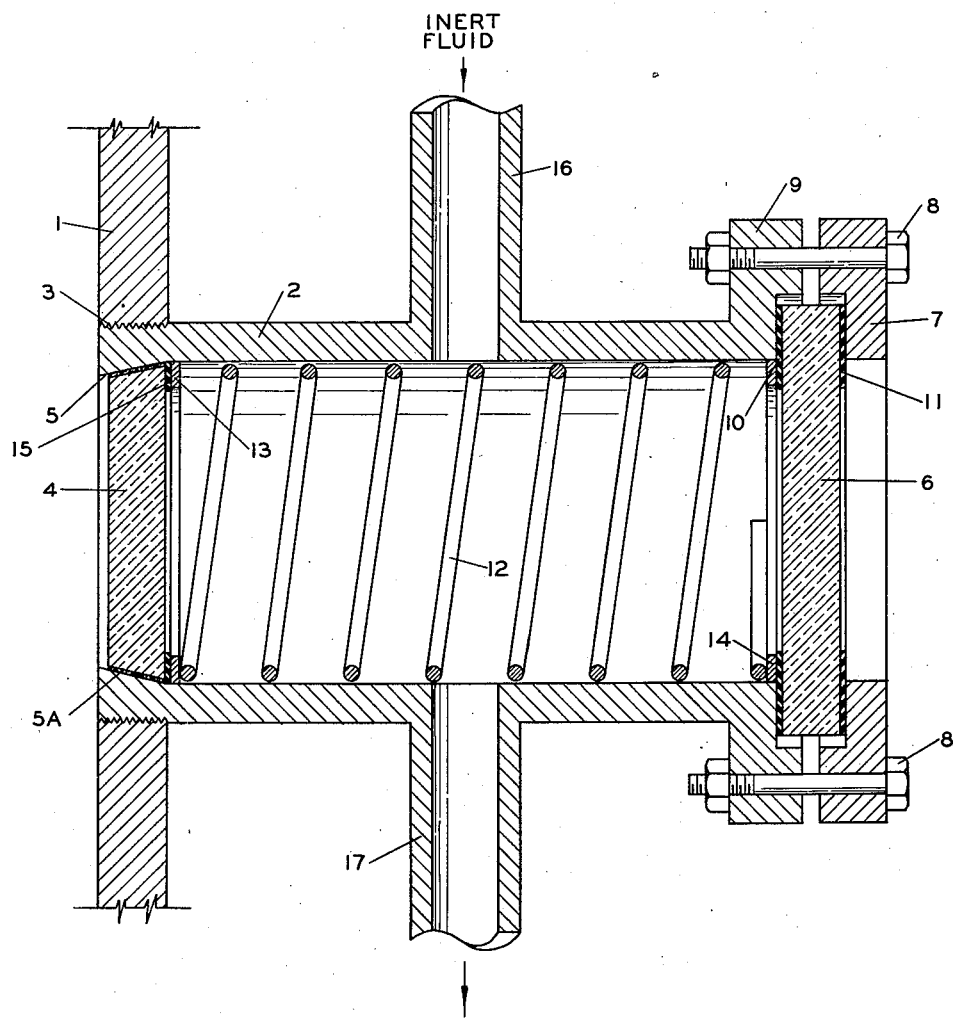
INVENTOR
MARYAN P. MATUSZAK Patented Sept. 5, 1944

2,357,753

UNITED STATES PATENT OFFICE 2,357,753

WINDOW RESISTANT TO HYDROFLUORIC ACID

Maryan P. Matuszak, Bartlesville, Okla., assignor to Phillips Petroleum Company, a corporation of Delaware Application February 6, 1942, Serial No. 429,839

6 Claims. (Cl. 23—252)

This invention relates to windows for use with substances that attack glass, and more particularly to windows for use with materials comprising glass-corrosive substances of the type of hydrofluoric acid.

In recent times, hydrofluoric acid has found increasing application and utility in processes involving the treatment of hydrocarbons derived primarily from petroleum sources.

The advantages flowing from the employment of this material as an improvement over conventional reagents in certain conversion processes are known to reside in greatly increased yields, shortened reaction periods, and relative freedom from side reactions. The deteriorating actions of the acid, however, on known materials of a transparent nature have seriously restricted its application in fields where its properties might otherwise be utilized to full advantage. It is highly desirable, in fact, indispensable in many instances, that some means be provided for observing the conditions existent within reaction vessels, gages, look-boxes, level indicators, and the like. Likewise, it is desirable in the utilization of many reactions in which hydrofluoric acid participates either as a reactant or as a catalyst, such as the hydrofluorination of olefins, polymerization of olefins, alkylation of paraffins, reconstruction of hydrocarbons, and many other reactions for the synthesis of organic compounds, to use look-boxes for setting tanks, fractionating columns, and other like auxiliary equipment.

The materials which have been previously employed as transparent sections of such equipment are eminently unsuitable for use in equipment designed for the handling of hydrofluoric acid because of its highly corrosive and etching characteristics. The acid, especially when concentrated or anhydrous, attacks and disintegrates common transparent substances such as glass, quartz, and even plastics ordinarily utilized in windows or transparent sections of apparatus. It has, therefore, constituted a problem of considerable magnitude to discover a material resistant to the powerful action of hydrofluoric acid which is sufficiently transparent for employment in vessels and equipment in which it is exposed to this acid. Equipment heretofore employed for confining materials including this acid were necessarily constructed entirely of suitably resistant metals or alloys which were opaque and afforded no means of visual observation. Experimental investigation and commercial utilization of many reactions involving hydrofluoric acid have, therefore, been hampered, consequently seriously restricting the development of this valuable material.

A primary object of the invention is the provision of a material of sufficient transparency for use with hydrofluoric acid.

A further object is the development of windows for hydrofluoric acid equipment.

Another object is to provide a material for use in hydrofluoric acid equipment which is inert to the action of the acid.

A further object is the provision of means for facilitating the control of reactions involving hydrofluoric acid.

An important object of the invention is the provision of a transparent resistant material in combination with a glass window for use in hydrofluoric acid vessels.

Other objects and advantages of this invention will be apparent from the following description and the accompanying drawing.

In accordance with this invention, windows resistant to attack by hydrofluoric acid are obtained by the use of suitable transparent crystalline oxides, such as synthetic alumina and synthetic magnesia crystals. These particular forms of the oxides of aluminum and magnesium, which are the two metals having atomic weights intermediate between those of sodium and silicon, are highly resistant to the action of hydrofluoric acid. Of the two oxides, synthetic crystalline alumina is preferred because at present it is obtained in crystals that are larger, clearer, more nearly uniform in properties, and more resistant to abrasion and erosion.

The transparent crystalline oxide may be shaped by any combination of suitable known means or technics, as, for example, by cleavage and/or grinding with the aid of particles of an equally hard or harder material, such as diamond, carborundum, or even the crystalline oxide itself. Usually a disk shape is preferable, but at times other shapes may be used. The edge is preferably slightly beveled, so that the crystal can be snugly and tightly wedged into a correspondingly shaped opening or seat in the wall of a vessel to be used for confining material comprising hydrofluoric acid, wherein it may be held by a metallic flange or ring or by suitably shaped lugs attached to the wall by machine screws or the equivalent.

Attachment of a properly shaped crystal in this manner is generally difficult because of the lack of fully satisfactory sealing or caulking materials. Most materials of the type of rubber, plastics, and cements deteriorate so rapidly when in contact with concentrated or anhydrous hydrofluoric acid as to be practically useless for gaskets or sealing materials. However, I have found that the use of a little finely flaked graphite at the interface or zone of juncture between the crystal and its seat is usually advantageous; and in many instances a caulking or bonding with molten sulfur, or preferably with an intimate mixture of finely flaked graphite and molten sulfur, is helpful. In each case the selection of a suitable sealing material will depend on the particular chemicals other than hydrofluoric acid to which the sealing material will be exposed.

In many instances, especially those in which the material to be visually observed comprises, in addition to hydrofluoric acid, a fluid that does not attack glass, the equipment may be advantageously so designed that a supply of this fluid is maintained between the exterior side of the crystal and a cooperating glass window, preferably under a pressure somewhat greater than that of the material comprising hydrofluoric acid, whereby any leakage of this acid between the crystal and its seat is positively prevented or overbalanced. This fluid may comprise one of the reactants to be later contacted with the hydrofluoric acid.

The accompanying drawing is a central vertical sectional view of a specific embodiment of the invention in which a fluid inert to glass is used in this manner.

In this drawing, wall 1 is part of the wall of a piece of equipment in which material comprising hydrofluoric acid is confined and is to be visually observed. At an opening in wall 1 is attached one end of generally cylindrical casing 2, preferably detachably, as by threaded joint 3. Closing this end of casing 2 is crystal disk 4, consisting of synthetic alumina or magnesia and having a slightly beveled edge that is wedged snugly and tightly into correspondingly shaped seat 5 in casing 2, preferably after the surfaces of contact have been coated with molten sulfur and/or finely flaked graphite 5A. Closing the other end of casing 2 is glass disk 6, secured in place by perforated annular flange piece 7, bolts 8, 8, cooperating perforated flange 9 of casing 2, and cushioning ring gaskets 10 and 11. The ring gaskets are made of somewhat resilient and suitably resistant material, such as a plastic of the type of synthetic rubber. Spiral spring 12 is preferably inclosed within casing 2 for the purpose of exerting enough pressure on crystal disk 4 to insure maintaining it in place in seat 5, although its absence should not be construed as going beyond the scope of this invention. The impact of the spiral spring on crystal disk 4 and on glass disk 6 is preferably cushioned, as by washers 13 and 14 and by ring gaskets 15 and 10, respectively. Inlet 16 and outlet 17 are provided for introduction and withdrawal of a fluid inert to glass, preferably a fluid that is to be mixed with hydrofluoric acid in the equipment of which wall 1 is a part. This fluid is preferably maintained in the space enclosed by casing 2, crystal disk 4, and glass disk 6 at a pressure somewhat greater than that within the equipment of which wall 1 is a part, so that any leakage of hydrofluoric acid between crystal disk 4 and seat 5 is prevented or overbalanced. In many instances, this fluid may be a hydrocarbon material, preferably in the liquid state; for example, in the hydrofluoric acid-catalyzed alkylation of isobutane with olefins, it ordinarily would be liquid isobutane and/or olefins.

Many modifications and variations of this invention will be apparent to those skilled in the art. The windows of this invention may be incorporated in any of many different pieces of equipment, such as, for example, reactors, processing apparatus, fractionating columns, and the like. Any desired number of windows may be incorporated in any particular piece of equipment. Advantage may be taken of the fact that visual observation is aided if two windows are placed on opposite sides of the equipment or of a tube connected in parallel or otherwise therewith. The invention should not be construed as necessarily excluding any process aspects such as those relating to maintaining a fluid inert to glass on the exterior side of the crystal of alumina or magnesia. In general, within the scope of the appended claims, the invention may be otherwise than as specifically described or illustrated herein.

I claim:

1. In a vessel, a metallic wall resistant to the action of hydrofluoric acid, a transparent panel contiguous with said wall comprising a crystalline oxide of a metal selected from the group consisting of aluminum and magnesium, and a sealing medium of flaked graphite between said panel and said wall.

2. In a vessel, a metallic wall resistant to the action of hydrofluoric acid, a transparent panel contiguous with said wall comprising a crystalline oxide of a metal selected from the group consisting of aluminum and magnesium, and a sealing medium consisting of flaked graphite and fused sulfur between said panel and said wall.

3. In a vessel, a metallic wall resistant to the action of hydrofluoric acid, a transparent panel contiguous with said wall comprising a crystalline oxide of a metal selected from the group consisting of aluminum and magnesium, and a sealing medium of fused sulfur between said panel and said wall.

4. A transparent window for hydrofluoric acid reaction vessels comprising a casing secured to a wall of the vessel, a transparent panel resistant to the action of hydrofluoric acid, said panel closing the end of the casing adjacent the reaction vessel, a transparent panel at the opposite end of the casing, and means for introducing a fluid to said casing between said panels.

5. A window resistant to hydrofluoric acid comprising the combination of a generally cylindrical casing, a closure at one end of the casing exposed to hydrofluoric acid comprising a transparent synthetic crystalline oxide of a metal selected from the group including aluminum and magnesium, a transparent glass closure at the other end of said casing, and means for passing an inert fluid through the casing.

6. A window resistant to hydrofluoric acid comprising the combination of a generally cylindrical casing, a closure at one end of the casing exposed to hydrofluoric acid comprising a transparent synthetic crystalline oxide of a metal selected from the group including aluminum and magnesium, a transparent glass closure at the other end of said casing, means for supporting said transparent elements, and means for passing an inert fluid through the casing.

MARYAN P. MATUSZAK.